United States Patent [19]

Yamazaki et al.

[11] 4,283,155
[45] Aug. 11, 1981

[54] APPARATUS FOR CONNECTION OF OPERATING ROD

[75] Inventors: Haruo Yamazaki; Masaharu Matsumoto, both of Yokohama; Shigeru Kimura, Kamakura, all of Japan

[73] Assignees: Nifco Inc.; Ohi Seisakusho Co., Ltd., both of Kanagawa, Japan

[21] Appl. No.: 106,459

[22] Filed: Dec. 26, 1979

[30] Foreign Application Priority Data

Dec. 23, 1978 [JP] Japan .................. 53-175467[U]

[51] Int. Cl.³ .............................................. F16C 11/00
[52] U.S. Cl. ................................................. 403/163
[58] Field of Search ................ 403/69, 70, 71, 163, 403/162, 161

[56] References Cited

U.S. PATENT DOCUMENTS

| | | | |
|---|---|---|---|
| 3,832,074 | 8/1974 | Dehar | 403/163 |
| 3,984,191 | 10/1976 | Doty | 403/69 |
| 3,993,410 | 11/1976 | Lindsay, Jr. | 403/71 X |
| 4,124,320 | 11/1978 | Rapata | 403/163 |

Primary Examiner—Andrew V. Kundrat
Attorney, Agent, or Firm—Trexler, Wolters, Bushnell & Fosse, Ltd.

[57] ABSTRACT

An apparatus for rotatably connecting an operating rod to a rotary operating member, which apparatus comprises a main connection member made of a synthetic resin and integrally provided with a head portion incorporating retention means for retaining the operating rod and an engaging leg portion extended perpendicularly from the lower side of the head portion, provided on the peripheral surface thereof with an engaging stepped portion and containing a hollow portion therein; and an insertion member made of a metallic material and provided with a female screw hole adapted for helical union with a male screw formed on the peripheral surface of the operating rod; the main connection member having an opening formed in the head portion thereof to a depth enough for communication with the hollow portion of the engaging leg portion.

5 Claims, 11 Drawing Figures

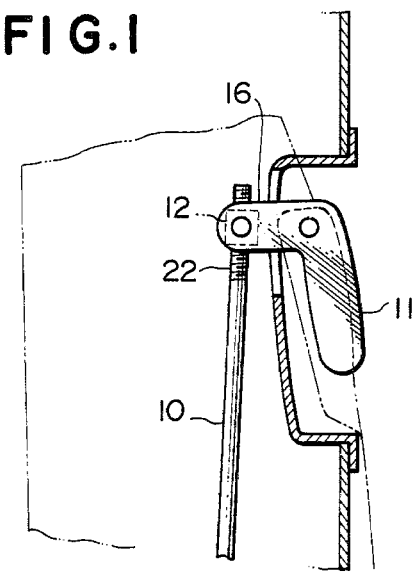
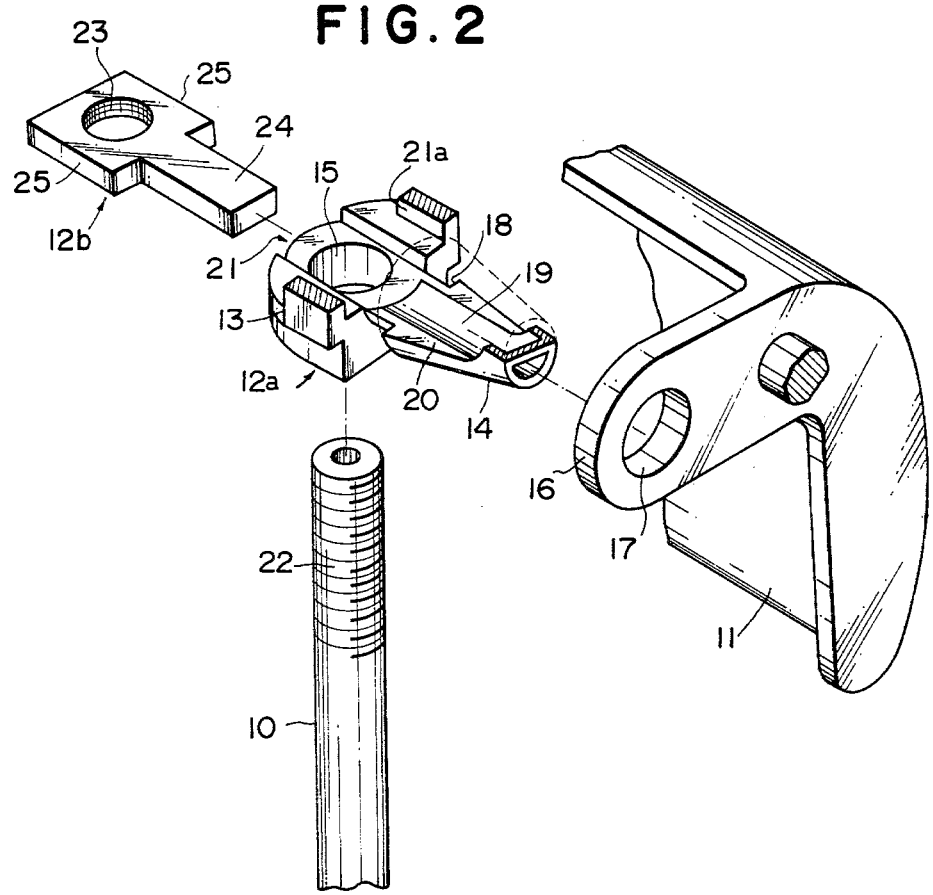

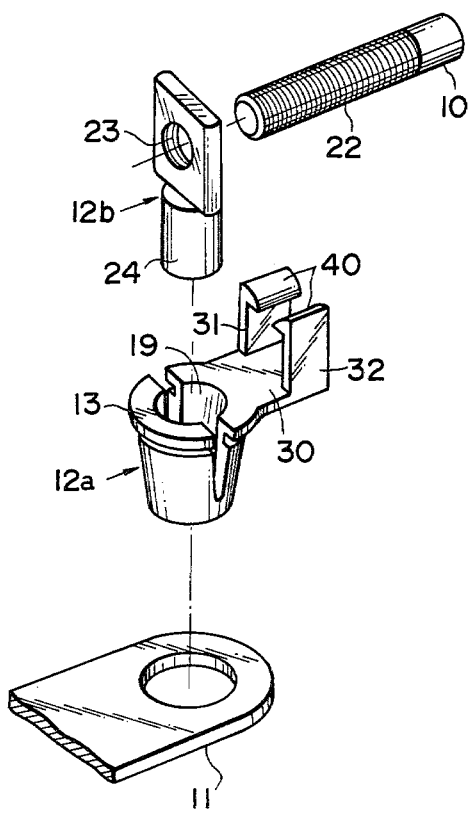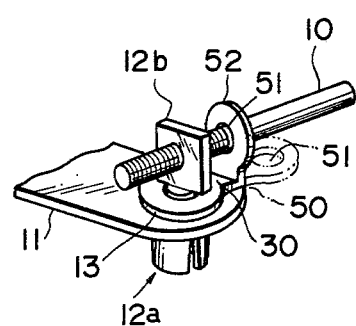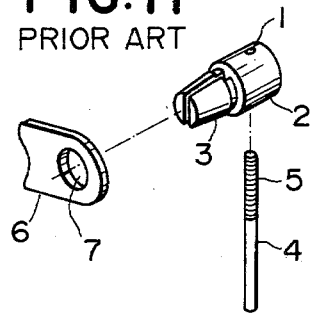

APPARATUS FOR CONNECTION OF OPERATING ROD

BACKGROUND OF THE INVENTION

This invention relates to an apparatus for the connection of a rod, to be used for establishing effective connection between a rod adapted to move linearly in the axial direction and a rotary operating member, typically such as between a lever and an operating rod in the locking mechanism incorporated in an automobile door, for example.

One of the connecting devices of this class heretofore known to the art comprises a head portion having a female screw hole pierced therethrough in the lateral direction, an engaging leg portion extended perpendicularly from the lower side of the head portion, the head portion and the engaging leg portion being integrally molded with a synthetic resin, a rod provided at the terminal portion thereof with a male screw portion matched to the aforementioned female screw hole, and an operating member containing therein a fitting hole for permitting forced entry of the aforementioned engaging leg portion, whereby the required connection of the rod to the rotary operating member is accomplished by helically joining the male screw portion with the aforementioned female screw hole and thereafter causing the engaging leg portion to slide past the fitting hole into rotatable engagement therewith.

The conventional connecting device described above enjoys high fabricability and ready availability at low price, because its principal parts are integrally moldable with a synthetic resin material. Further, it enjoys the advantage that the assemblage of the device is effected with a simple procedure of helically joining the rod with the female screw hole and then inserting the engaging leg portion into the fitting hole of the operating member. Moreover, the fact that the length of the rod can be accurately adjusted by suitably controlling the helical insertion of the rod into the female screw hole adds much to the convenience of the work of assemblage.

Since the aforementioned device is formed of a synthetic resin material, however, it fails to provide fully reliable strength as needed when it is used in a connection mechanism operated with high frequency and exposed to heavy load. Particularly in case where the male screw portion of a metal rod is helically joined with the female screw hole, there ensues a fair possibility that the female screw hole, because of its material, will tend to sustain damage. Besides, in the case of the engaging leg portion intended for engagement with the fitting hole of the operating member, the slit cut into this leg portion for the purpose of decreasing the force required for its insertion in the process of the engagement can deprive the leg portion of its force of engagement possibly to a point where the leg portion will fall off the hole or snap.

Further the conventional device described above does not tolerate any change in the diameter of the rod because the female screw hole to which the rod is connected is directly bored in the head portion. Thus, it has the disadvantage that the rod to be used in the device is required to have a fixed diameter.

SUMMARY OF THE INVENTION

In due consideration of the state of affairs mentioned above, the present invention has been accomplished.

The object of the present invention is to provide an apparatus for the connection of an operating rod, which makes the most of the characteristics of the synthetic resin to be used as the raw material, compensates for the weak points of the resin, adds to the reliability of its performance as the connecting means, and enjoys ample tolerance for change in the diameter of the rod owing to interchangeability of some of the parts used therein.

To attain the object described above, according to the present invention, there is provided an apparatus for rotatably connecting an operating rod to a rotary operating member which apparatus comprises a main connection member made of a synthetic resin and integrally provided with a head portion incorporating retention means for retaining the operating rod and an engaging leg portion extended perpendicularly from the lower side of the head portion, provided on the peripheral surface thereof with an engaging stepped portion and containing a hollow portion therein; and an insertion member made of a metallic material and provided with a female screw hole adapted for helical union with a male screw formed on the peripheral surface of the operating rod; the main connection member having an opening formed in the head portion thereof to a depth enough for communication with the hollow portion of the engaging leg portion.

The other objects and characteristic features of the present invention will become apparent from the description to be given hereinafter in detail with reference to the accompanying drawing.

BRIEF EXPLANATION OF THE DRAWING

FIG. 1 is a partially sectioned plan view illustrating the condition in which the apparatus of this invention is put to use.

FIG. 2 is a partially cutaway, enlarged and exploded perspective view of the essential portion of the apparatus.

FIG. 9 is an exploded perspective view of still another embodiment of the present invention.

FIG. 10 is a perspective view of yet another embodiment of the present invention in the condition of its use.

FIG. 11 is an exploded perspective view illustrating a typical conventional connection device.

DETAILED DESCRIPTION OF PREFERRED EMBODIMENT

Figure 3:
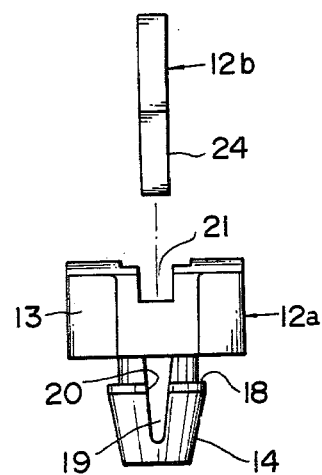
FIG. 3 is an exploded front view of the connection apparatus.
Figure 4:
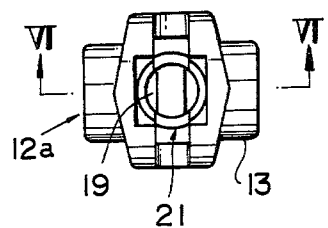
FIG. 4 is a plan view of the main connection member in the connection apparatus.
Figure 5:
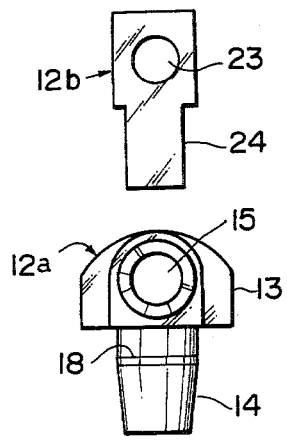
FIG. 5 is a right side view of the connection apparatus of FIG. 3.
Figure 6:
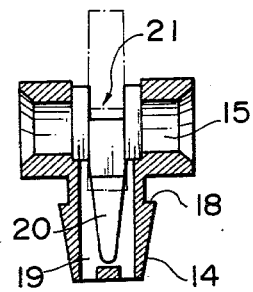
FIG. 6 is a sectioned view of the main connection member taken along the line VI—VI in the diagram of FIG. 4.

As illustrated in FIG. 11, one of the existing connecting devices comprises a head portion 2 having a female screw hole 1 pierced therethrough in the lateral direction, an engaging leg portion 3 extended perpendicularly from the lower side of the head portion 2, the head portion and the engaging leg portion being integrally molded with a synthetic resin, a rod 4 provided at the terminal portion thereof with a male screw portion 5 matched to the aforementioned female screw hole 1, and an operating member 6 containing therein a fitting hole 7 for permitting forced entry of the aforementioned engaging leg portion 3, whereby the required connection of the rod 4 to the rotary operating member 6 is accomplished by helically joining the male screw portion 5 with the aforementioned female screw hole 1 and thereafter causing the engaging leg portion 3 to slide past the fitting hole 7 into rotatable engagement therewith.

Now, the present invention will be described hereinafter in detail with reference to the embodiment illustrated in FIGS. 1-10 to demonstrate the characteristics thereof.

The illustrated embodiment represents the application of the present invention to the connection of an operating rod 10 of the locking mechanism installed inside an automobile door to an operating lever 11 disposed on the inner side of the door. FIG. 1 is a partially sectioned plan view illustrating the condition in which the apparatus of this invention is put to use. FIG. 2 is a partially cutaway, enlarged and exploded perspective view of the essential part of the apparatus. In the drawing, the symbol 12 denotes the connection apparatus according to the present invention.

The connection apparatus 12 comprises a main connection member 12a formed integrally of a synthetic resin material and an insertion member 12b molded independently of a metallic material and adapted to be incorporated in the main connection member.

The main connection member 12a is provided integrally with a head portion 13 and an engaging leg portion 14 extended downwardly from the lower side of the head portion. The head portion 13 has an insertion hole 15 pierced in the lateral direction therethrough, which insertion hole serves as a retention means for holding the operating rod in position.

The engaging leg portion 14 mentioned above is intended for engagement with a fitting hole 17 perforated in a swing piece 16 which is formed on the aforementioned operating lever 11. Halfway along the entire length thereof, this leg portion 14 is provided with a substantially annular engaging stepped portion 18 serving to ensure fast engagement thereof with the fitting hole. The peripheral surface of this leg portion forward from this stepped portion to the leading end is tapered in the direction of the leading end to facilitate the insertion of the leg portion into the aforementioned fitting hole 17. The leg portion for the insertion is provided with a hollow portion 19 formed axially at the center and further provided in the forward and rearward surfaces each with a slit 20 cut lengthwise to communicate with the aforementioned hollow portion 19. These slits serve the purpose of enabling the leg portion 14 incorporating the stepped portion 18 to be easily contracted during the insertion of the leg portion into the fitting hole 17. In the head portion incorporating the insertion hole 15, there is formed an opening 21 which starts from the upper central portion of the head portion, intersects the insertion hole halfway along its entire length, and extends as far as its leading (lower) end terminates in the hollow portion of the leg portion to be inserted.

This opening 21 is intended to accommodate the separately formed insertion member 12b. In the present embodiment, the central part of the head portion 13 in which the opening 21 is formed is bulged out in the forward and rearward ends so much that the width of the opening 21 substantially exceeds the cross-sectional diameter of the insertion hole 15.

The insertion member 12b which is incorporated in the main connection member 12a is punched out of a metal plate having the thickness which is required to be possessed by the insertion member. The main part of this insertion member has a shape matched to the outer boundary of the opening 21. The central part of the insertion member is pierced through by a female screw hole 23 matched to a male screw member 22 formed on the peripheral surface at the axial end of the aforementioned operating rod 10. The insertion member is further provided integrally with a tongue-shaped edge piece 24 on the peripheral edge in the main part thereof. In the present embodiment, the aforementioned main part of the insertion member is formed in a square shape so that the opposite lateral sides 25 thereof conform with the opposed surfaces 21a, 21a of the opening 21. Besides, the wedge piece 24 is formed in a size small enough for the wedge piece to be admitted into the hollow portion 19 of the engaging leg portion 14 without exertion of force.

The main connection member 12a and the insertion member 12b which are separately formed as described above serve to connect the operating rod and the lever to each other when they are united into one integral body by having the insertion member passed through the opening 21 into firm engagement with the main connection member.

Now the relation touched upon above will be described in detail below. Preparatory to the actual work of union, the main connection member 12a and the insertion member 12b are placed separately of each other. First, the engaging leg portion 14 of the main connection member is pushed into the fitting hole 17 formed in the swing piece 16 of the operating lever 11. By virtue of the hollow portion 19 and the slits 20, the engaging leg portion is allowed to contract radially enough for the engaging stepped portion 18 formed on the peripheral surface thereof to slide past the fitting hole and come into fast engagement with the outer edge of this hole. Of course, the leg portion thus brought into engagement with the fitting hole enjoys freedom of rotation about its axis because the base end portion thereof has a smaller diameter than the inside diameter of the fitting hole.

After the main connection member and the operating lever have been connected to each other as described above, the insertion member 12b is pushed into the opening 21. By this insertion, the wedge piece 24 is thrust into the hollow portion of the engaging leg portion 14 and brought into fast engagement therewith and, at the same time, the female screw hole 23 formed in the main part is registered with the insertion hole 15 of the head portion 13. Subsequently, the axial end of the operating rod 10 is plunged in through one opening and helically set into the aforementioned female screw hole 23, with the result that the connection apparatus 12 and the operating rod 10 are connected to each other. At this time, the insertion member fits perfectly into the opening 21. Because of this tight fitting coupled with the fitting of the wedge piece into the hollow portion 19, the main connection member and the operating rod are not allowed to rotate jointly. Further, the length of the operating rod which is helically connected to the connection member, namely the distance between the locking mechanism which is not shown in the drawing and the operating lever 11, can be adjusted by controlling the depth with which the rod is driven helically into the female screw hole 23.

FIGS. 7-10 represent another preferred embodiment of the present invention. Particularly the present embodiment illustrates a modification to the retention means which is provided on the head portion 13 of the main connection member 12a. Now, this other embodiment will be described. In the embodiment illustrated in FIGS. 7-8, the head portion 13 which is provided on the main connection member 12a is formed in the shape of a flange. A horizontal plate piece 30 is extended outwardly from the periphery of the head portion. From the surface of this plate piece, two walls 31, 32 opposed to each other across a space large enough for passage of the operating rod are raised. The one wall 31 is provided at the upper end thereof with an inwardly protruding engaging claw 33 and the other wall 32 is provided on the upper edge thereof with an engaging piece 35 adapted to be bent by the medium of a hinge portion 34. Thus, the operating rod passed between the two opposed walls 31, 32 can be retained in position by causing the engaging piece 35 to be bent about the hinge portion 34 as the fulcrum and allowing the free end of the engaging piece to be hooked on the engaging claw 33 of the wall 31. In the present embodiment, the hollow portion 19 of the engaging leg portion 14 and the opening 21 formed upwardly thereon jointly form a spherical space. On the other hand, the wedge piece 24 of the insertion member 12b has the shape of a cylindrical shaft matched to the opening 21 so that the main connection member 12a and the insertion member 12b, when joined to each other, fit perfectly to each other. When the perfect setting is established as described above, the female screw hole 23 formed in the insertion member 12b faces to the center between the aforementioned opposed walls 31, 32 so that it can be helically joined with the male screw portion 22 of the operating rod 10 which thrusts in through the space intervening between the two walls.

In the present embodiment, since the connection apparatus 12 has the retention means constructed as described above, the helical engagement of the operating rod with the female screw hole 23 may be effected after the insertion member 12b has been joined to the main connection member 12a, or the operating rod and the female screw hole may be helically joined to each other in advance to the joining of the insertion member and, with the rod and the hole held in the joined state, the insertion member may be incorporated into the main connection member. In either case, the operating rod 10 can be held eventually in position by causing the engaging piece 35 provided on the wall 32 to be hooked on the engaging claw 33 on the wall 31. Consequently, the insertion member 12b to which the rod has been helically joined is not allowed to loose itself readily from the main connection member 12a.

Figure 7:
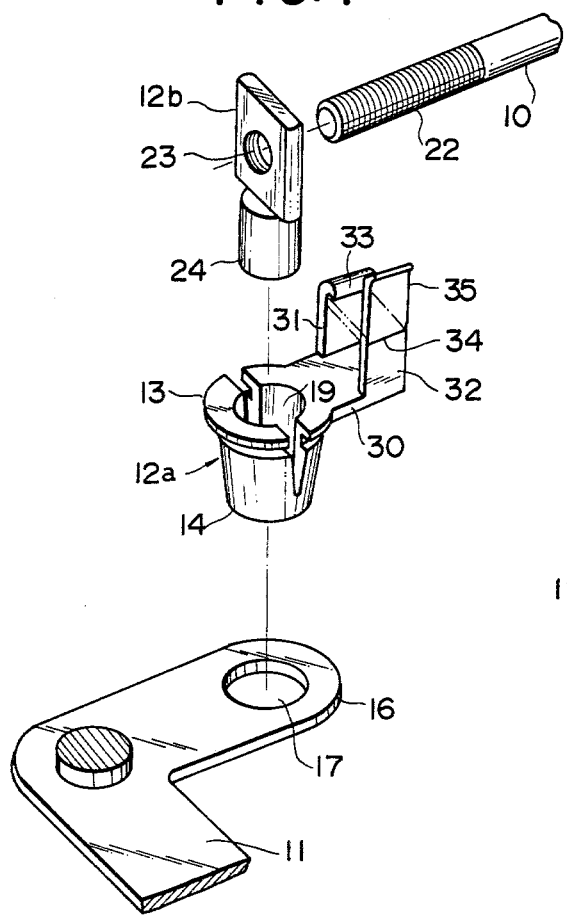
FIG. 7 is an exploded perspective view illustrating another embodiment of the present invention.
Figure 8:
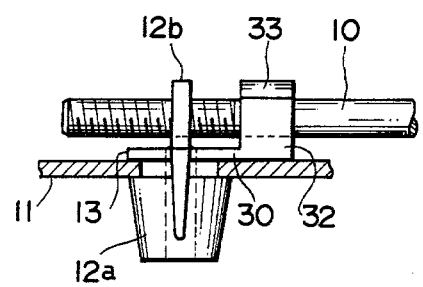
FIG. 8 is a partially sectioned view illustrating the condition in which the embodiment of FIG. 7 is put to use.

FIG. 9 illustrates a partial modification to the retention means illustrated in the embodiment of FIGS. 7-8. In this modification, the two opposed walls 31, 32 raised upwardly from the upper surface of the aforementioned horizontal plate piece 30 are provided on the upper ends thereof respectively with engaging claws 40 formed to protrude inwardly toward each other. The illustrated embodiment represents a typical case wherein the opposed walls 31, 32, by virtue of the elasticity of the material used, permit forced insertion therein of the operating rod 10 and the two engaging claws 40 serve to prevent the operating rod thus laid between the walls from slipping upwardly.

In the two embodiments cited above, the operating rod 10 can have its axial end passed sidewise between the two opposed walls 31, 32 and helically engaged with the female screw hole 23 in the insertion member 12b. Nevertheless, the embodiments invariably pay due attention to the particular convenience obtained where the insertion member 12b is joined with the main connection member 12a after the operating rod has been helically engaged with the female screw hole in advance. Thus, the procedure of work can freely be selected prior to the actual work of assembly and the desired adjustment of the length of the operating rod can be carried out smoothly.

FIG. 10 represents yet another preferred embodiment of this invention, wherein a retention piece 52 having a through hole 51 perforated at the center is joined, integrally through the medium of a hinge portion 50 to the edge portion of the horizontal plate piece 30 to take the place of the aforementioned two walls 31, 32. In the present embodiment, the retention piece 52 is raised at right angles from the aforementioned hinge portion 50 as the fulcrum and opposed to the insertion member 12b which is incorporated in advance into the main connection member 12a so that the operating rod 10 can be helically joined to the female screw hole 23 in the insertion member via the through hole 51 perforated at the center of the retention piece. This embodiment particularly presumes that the main connection member 12a will be molded of a synthetic resin. Needless to mention, the retention piece 52 illustrated in the present embodiment is intended to prevent the insertion member which has the operating rod helically joined therewith from slipping out of the main connection member.

The present invention has been described with reference to a few preferred embodiments. In short, the present invention accomplishes the desired connection of the operating rod by a simple procedure of bringing the engaging leg portion of the main connection member into engagement with the fitting hole, joining the insertion member to the main connection member and helically setting the operating rod into the female screw hole of the insertion member. The amount of work involved herein is substantially equal to that involved in the conventional connection devices of this class. Since the operating rod is not directly screwed into the main connection member made of a synthetic resin but is helically joined thereto through the medium of an insertion member which is made of a metallic material, the apparatus of the present invention can be expected to provide the desired connection with the fastness never expected of the conventional connection devices. Besides, the female screw hole with which the adjustment of the length of the operating rod is accomplished is not damaged by the work of this connection.

Since the insertion member and the main connection member are formed separately of each other and they are combined prior to their actual use, the apparatus of this invention has the advantage that it provides desired connection for operating rods of varying diameters by using insertion members which contain female screw holes of matched diameters.

Further in the apparatus of this invention, the engaging leg portion acquires desirable reinforcement from the insertion of the wedge piece of the insertion member into the hollow portion of the engaging leg portion of the main connection member. Owing to this reinforcement, the apparatus neither sustains cut nor slips out of the fitting hole unexpectedly even under a high load possibly exerted thereon by the movement of the operation lever. Thus, it can be used quite safely.

Depending on methods by which the apparatus is put to use, the apparatus enjoys many other features. In the embodiment illustrated in FIGS. 1-6, there is the advantage that the operating rod can be helically joined with the connection device, particularly the insertion hole thereof, from any desired direction. In the two embodiments illustrated in FIGS. 7-9, there is enjoyed the advantage that the operating rod is helically joined to the insertion member in advance and, thereafter, the insertion member is incorporated into the main connection member. Particularly the last embodiments prove highly advantageous for the purpose of the adjustment of the length of the operating rod where the operating rod happens to be incapable of rotation around its axis.

In all the embodiments cited, the main connection member and the insertion member are invariably formed separately of each other and, therefore, can be produced with ease. In terms of price, the apparatus of this invention is not markedly different from any of the conventional devices of the same class. Since it excels the conventional countertypes in terms of operational efficiency and durability, it proves decidedly advantageous over the conventional devices from the economical point of view.

What is claimed is:

1. An apparatus for rotatably connecting an operating rod to a fitting having a hole therein, which apparatus comprises:
    a one piece main plastic connection member including a head portion having retention means provided thereon for retaining said operating rod extending in one direction and having opposed surfaces defining an opening therethrough; an engaging leg portion extending transversely of said one direction from a side of said head portion for insertion into said fitting hole, said leg portion having shoulder means on a peripheral surface thereof for engaging said fitting and having means defining a hollow portion therein in communication with the opening of said head portion; and
    a metallic insertion member removably insertable in said opening and said hollow portion, said insertion member including female screw hole means in alignment with said retention means for helical union with a male screw formed on a peripheral surface of said operating rod.

2. An apparatus according to claim 1 wherein said metallic insertion member further includes opposite lateral sides removably engaging said opposed surfaces.

3. An apparatus for rotatably connecting an operating rod to a fitting hole, which apparatus comprises:
    a main connection member made of a synthetic resin and integrally provided with a head portion having retention means provided thereon for retaining said operating rod and with an engaging leg portion which extends perpendicularly from the lower side of said head portion, which leg portion has an engaging stepped portion provided on the peripheral surface thereof and contains a hollow portion therein; and
    an insertion member made of a metallic material, provided with a female screw hole adapted for helical union with a male screw formed on the peripheral surface of the operating rod, and assembled with said main connection member;
    said main connection member having an opening formed in the head portion thereof to a depth enough for communication with the hollow portion of said engaging leg portion;
    whereby the connection of the operating rod to the operating member is accomplished by fitting said insertion member into said opening, helically joining said operating rod to the female screw hole of said insertion member and, at the same time, causing the operating rod to be retained in position by said retention means provided on the head portion of the main connection member, and pushing said engaging leg portion through the fitting hole in said operating member into rotatable engagement with the operating member.

4. The connection apparatus according to claim 2 or 3 wherein the retention means is a through insertion hole formed perpendicularly to the center line of the engaging leg portion; said opening is formed along the center line so as to cross the through insertion hole laterally; and the opposed surfaces of the opening and the opposite lateral sides of the insertion member are formed each to have a rectangular cross-section.

5. The connection apparatus according to claim 1 or 3 wherein the insertion member is integrally provided with a wedge piece adapted so as to be thrust into the hollow portion in the engaging leg portion of the main connection member.

* * * * *